United States Patent [19]
Kuhn et al.

[11] Patent Number: 5,265,809
[45] Date of Patent: Nov. 30, 1993

[54] MANURE SPREADER

[75] Inventors: Fred G. Kuhn, Elkhart Lake; Wilbur Groeneveld, West Bend, both of Wis.

[73] Assignee: Gehl Company, West Bend, Wis.

[21] Appl. No.: 954,895

[22] Filed: Sep. 30, 1992

[51] Int. Cl.⁵ ............................................. A01C 23/00
[52] U.S. Cl. ................................. 239/675; 239/672; 198/311
[58] Field of Search ............... 239/650, 668, 670, 671, 239/672, 675; 198/311, 550.1

[56] References Cited

U.S. PATENT DOCUMENTS

| | | | |
|---|---|---|---|
| 365,519 | 6/1887 | Hotham | 239/673 |
| 2,489,801 | 11/1949 | Myott | 239/675 X |
| 3,025,067 | 3/1962 | Raney et al. | 239/658 |
| 3,197,075 | 7/1965 | Hansen | 222/134 |
| 3,236,527 | 2/1966 | Snyder | 239/656 |
| 3,295,855 | 1/1967 | Sadler et al. | 239/681 |
| 3,420,452 | 1/1969 | Vaughan | 239/670 |
| 3,765,526 | 10/1973 | Hubbard et al. | 198/672 |
| 3,964,714 | 6/1976 | Crawford et al. | 239/662 |
| 4,117,920 | 10/1978 | Oury | 198/311 |
| 4,362,272 | 12/1982 | Martin | 239/7 |
| 4,467,967 | 8/1984 | Martin | 239/675 |
| 4,475,692 | 10/1984 | Walley | 239/662 |
| 4,993,632 | 2/1991 | Martin | 239/7 |
| 5,085,372 | 2/1992 | Martin | 239/675 |

FOREIGN PATENT DOCUMENTS

| | | | |
|---|---|---|---|
| 663873 | 5/1963 | Canada | 275/5 |
| 688394 | 3/1953 | United Kingdom . | |
| 1153106 | 5/1969 | United Kingdom . | |

Primary Examiner—Andres Kashnikow
Assistant Examiner—Lesley D. Morris
Attorney, Agent, or Firm—Emrich & Dithmar

[57] ABSTRACT

A manure spreader includes a generally V-shaped hollow body, or hopper, disposed on a movable frame and having a side discharge rotary expeller for spreading the manure over a wide area as the spreader is displaced. A conveyor auger within a lower portion of the V-shaped body moves the manure toward a forward discharge aperture disposed adjacent the expeller for discharge. A pair of hydraulic cylinders move the rotating auger from a lower portion of the V-shaped body upward along an inclined body wall, maintaining an essentially fixed, close spacing between the conveyor auger and the expeller and also maintaining a working relationship between the conveyor auger and the body wall. The upward displacement of the conveyor auger loosens and breaks bridge formations of the manure above the conveyor auger, while continuing to convey the material in all positions of elevation. The conveyor auger is displaced along a radial arc preferably centered on the expeller axis of rotation to form a wide, open volume within the tank to allow the chunky, hardened manure to drop down into the path of the conveyor auger for transport and discharge. A suitable drive mechanism drives the auger conveyor and expeller combination, with a planetary gear reducer preferably driving the moveable conveyor auger.

16 Claims, 5 Drawing Sheets

MANURE SPREADER

FIELD OF THE INVENTION

This invention relates generally to manure or industrial or municipal waste spreaders such as used in agriculture and is particularly directed to a manure spreader for loosening hard packed manure and spreading the manure uniformly over a large area.

BACKGROUND OF THE INVENTION

Manure spreaders such as used in agricultural applications are generally of the liquid type and include spray equipment or are intended for use with non-liquid manures and include flail-type spreaders with rotating aprons or movable gates. As used herein, the term "manure" is understood to mean animal waste as well as municipal and industrial waste.

When spreading certain types of manure such as chunks of feed lot manure, the manure tends to bridge over the spreader's conveyor which is typically a rotating auger. This bridging effect prevents the conveyor from continuously engaging and displacing the manure toward and into an expeller for discharge. In effect, a cavity, or hollow space, is formed about the rotating conveyor auger which prevents further engagement of the manure by the conveyor auger. With the spreader typically traveling at a ground speed of 4-6 miles per hour, or approximately six (6) feet per second, and with a discharge pattern of 20-30 feet to the side of the spreader, any interruptions in the auger-expeller feed relationship will result in large gaps in the manure spread pattern. Attempts to break down the self-supporting bridge of hard-packed, dense manure over the conveyor auger have generally involved displacing the conveyor auger vertically. One such approach is disclosed in U.S. Pat. No. 5,085,372, where the conveyor auger is displaced from a lower portion of the V-shaped manure tank in an upward, generally vertical direction to break up the manure forming a bridge over the conveyor auger. While this approach offers an improvement in manure discharge from the spreader tank, the compacted manure on each side of the conveyor auger remains free of the auger and is not discharged from the tank into the expeller. In addition, with the increase in the auger-expeller spacing, the feeding relationship between the auger and expeller may be lost, or at least substantially reduced, to prevent uniform, controlled manure spreading.

SUMMARY AND OBJECTS OF THE INVENTION

The present invention addresses the aforementioned limitations of the prior art by providing a short, fixed spacing between the spreader's auger and expeller to maintain the feeding relationship between the auger and expeller. A continuous working relationship is also maintained between the conveyor auger and spreader tank wall while moving the conveyor auger through the compacted manure to break up the bridge effect. The combination of the fixed spreader tank wall and moving conveyor auger maintain an essentially constant, high level of material flow when the conveyor auger is raised to loosen the manure load and break the manure bridging. In addition, the present invention maintains a fixed, short distance between the discharge expeller and moving conveyor auger to simplify the drive system by eliminating the requirement for idler sprockets for the chain drive between the auger and expeller previously required to compensate for variation in chain drive length as the auger is displaced. Minimizing the distance between the conveyor auger and discharge expeller and maintaining the working relationship between the conveyor auger and spreader tank wall provides a continuous, uniform material flow from the manure tank to the discharge expeller and ensures uniform, regulated manure spread distribution. While described primarily for use in spreading manure, the spreader of the present invention may also be used to spread municipal and industrial wastes.

Accordingly, it is an object of the present invention to provide a manure spreader particularly adapted for spreading chunks of hard packed manure uniformly over a large area.

Another object of the present invention is to loosen hard packed manure in a hollow body and to prevent bridging of the hardened manure over a rotating conveyor auger in a lower portion of the hollow body.

Yet another object of the present invention is to improve the handling and discharge of solid, hard packed manure in a spreader by loosening the manure along a lower inclined wall of the spreader's V-shaped storage tank and directing the thus loosened manure to a discharge aperture in the tank.

A further object of the present invention is to provide a manure discharge drive arrangement for use in a manure spreader which is highly reliable, requires reduced power, and is adapted for actuation directly from the power take-off (PTO) unit of a tractor.

A still further object of the present invention is to provide a manure spreader adapted for handling solid, hard packed manure which tends to produce bridging over the spreader's conveyor as well as manure in liquid and semi-liquid form without leakage.

It is another object of the present invention to maintain in a manure spreader generally fixed, close spacing between the tank trough wall and conveyor auger during displacement of the conveyor auger to maintain continuous forward material movement and supply to the discharge expeller.

Yet another object of the present invention is to maintain in a manure spreader a constant distance relationship or separation between the spreader's conveyor auger and its discharge expeller for improved manure discharge.

BRIEF DESCRIPTION OF THE DRAWING

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION

Figure 1:
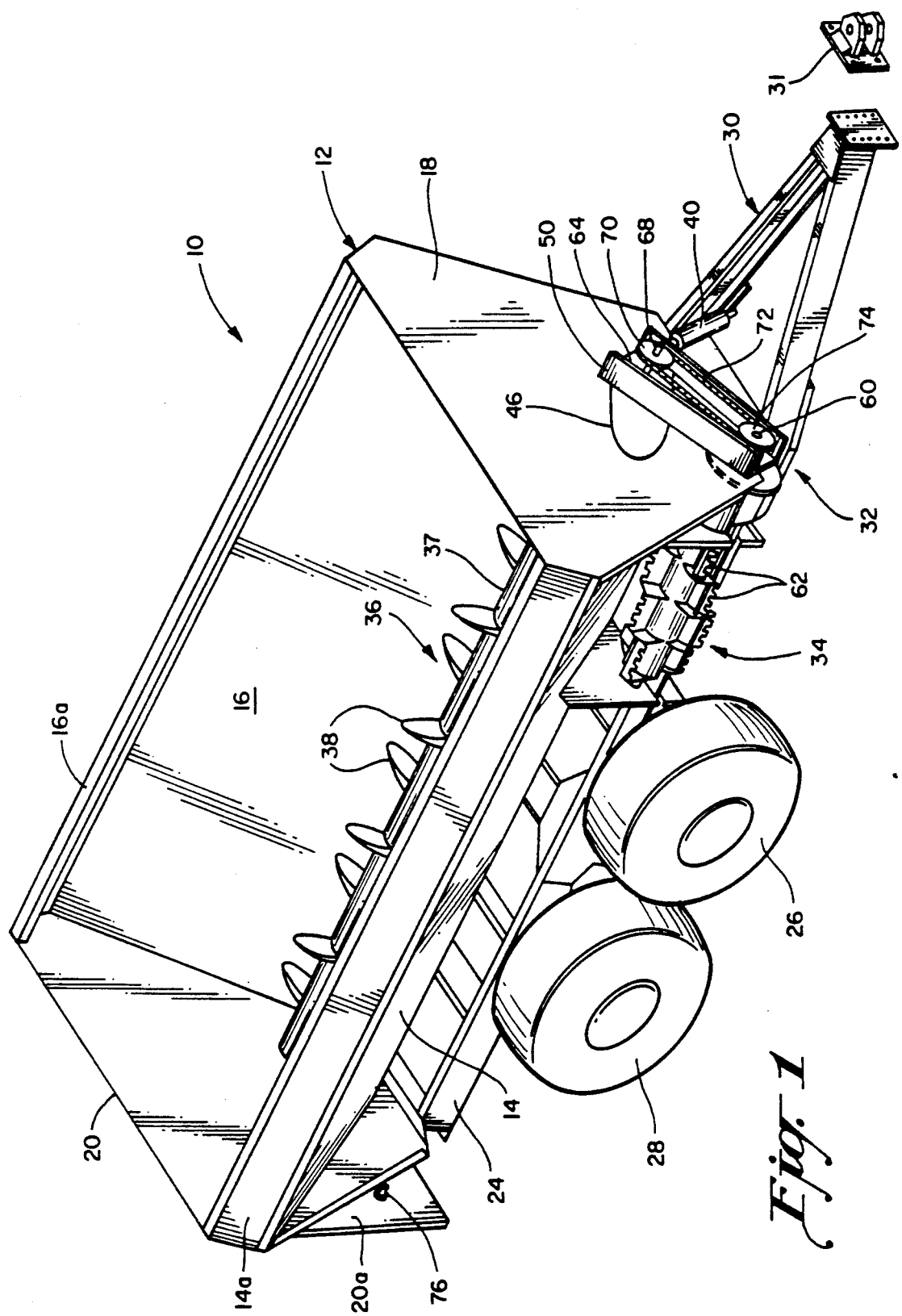
FIG. 1 is an upper perspective view of a manure spreader in accordance with one embodiment of the present invention.
Figure 2:
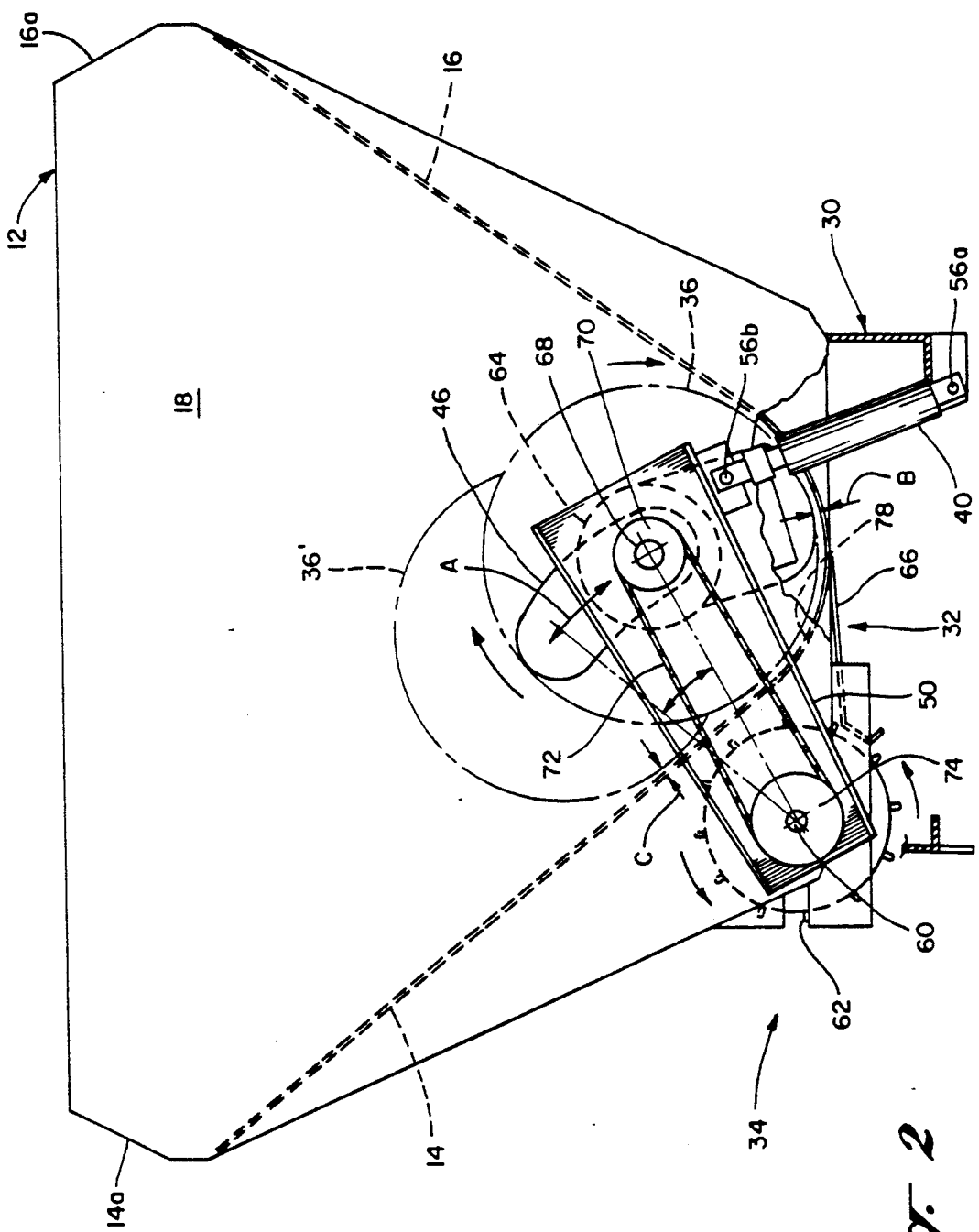
FIG. 2 is a partial front elevation view shown partially cut away and partially in phantom of the manure spreader of FIG. 1.
Figure 3:
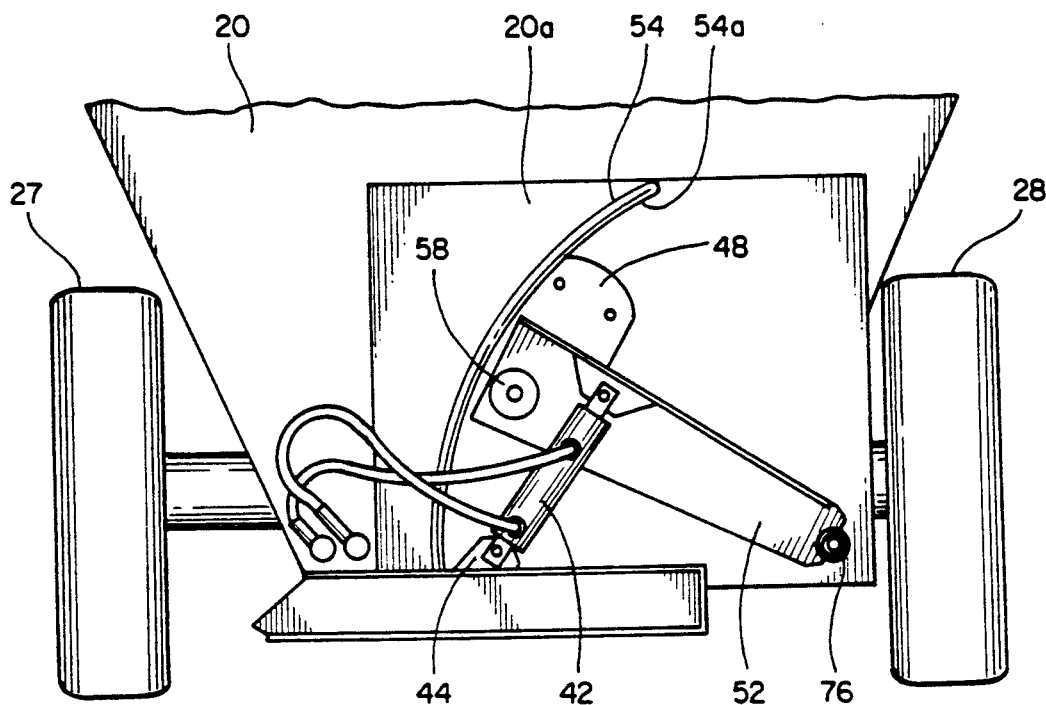
FIG. 3 is an aft elevation view of the manure spreader of FIG. 1.

Referring to FIG. 1, there is shown an upper perspective view of a manure spreader 10 in accordance with the principles of the present invention. A partial front elevation view of the manure spreader 10 of FIG. 1 is shown partially cut away and partially in phantom in FIG. 2. FIG. 3 is an aft elevation view of the manure spreader 10 of FIG. 1.

Manure spreader 10 includes a hollow tank-type body, or hopper, 12 mounted on and supported by a chassis, or support frame, 24. Chassis 24 is, in turn, coupled to and supported by a plurality of wheels, in the present case four, where three of the four wheels are shown as elements 26, 27 and 28 in the figures. The manure spreader 10 further includes a forward A-frame 30 adapted for attachment to a clevis-type hitch mounted to a vehicle such as a tractor (not shown for simplicity) by means of a hitch clip 31. Chassis 24 and A-frame 30 are generally comprised of a high strength steel to provide the required support for large manure loads in the tank-type body 12.

Tank-type body 12 includes right and left side walls 14 and 16 which are sloped inwardly in a downward direction so as to form a generally V-shaped lower body portion into which manure deposited in the open upper portion of the body is directed. Upper portions of the right and left side walls 14, 16 are provided with respective inwardly-directed splash guards 14a and 16a. Tank-type body 12 further includes forward and aft walls 18 and 20, each attached to the right and left side walls 14, 16 to form a hollow structure open at the top.

Disposed within the V-shaped lower portion of body 12 along the length thereof is a conveyor auger 36 comprised of a shaft, or tube, 37 and a plurality of blades 38 arranged in a spaced manner along the length of the shaft. Rather than incorporating a plurality of spaced blades 38, the conveyor auger 36 may include a continuous spiral flight along its length. Disposed in a forward portion of the V-shaped lower portion of body 12 is a discharge aperture 78. Disposed adjacent the discharge aperture 78 and outside of the tank-type body 12 is the combination of a side-spreading mechanism, or expeller, 34 and a bottom plate 66 of the expeller. The combination of auger 36 and expeller 34 operate in the following manner to remove manure from body 12 and discharge it alongside the manure spreader 10. Clockwise rotation of the conveyor auger 36 as shown in FIG. 2, causes the auger blades 38 to engage and displace the manure toward the front of the tank-type body 12. When the thus displaced manure reaches a forward portion of the V-shaped lower portion of the tank-type body 12, manure exits the body through the discharge aperture 78 and is directed via bottom plate 66 toward and onto the counterclockwise rotating expeller 34. Disposed about the periphery of expeller 34 are a plurality of spaced blades 62 which engage and discharge the manure upward and outward from the manure spreader 10. In a preferred embodiment, the conveyor auger 36 rotates in a clockwise direction at a speed of approximately 20 RPM, while the expeller 34 rotates in a counterclockwise direction at a speed on the order of 810 RPM. Details of the drive arrangement for rotationally displacing the conveyor auger 36 and expeller 34 as well as for moving the conveyor auger upward to break manure bridges in accordance with the present invention are provided in the following paragraphs.

Figure 5:
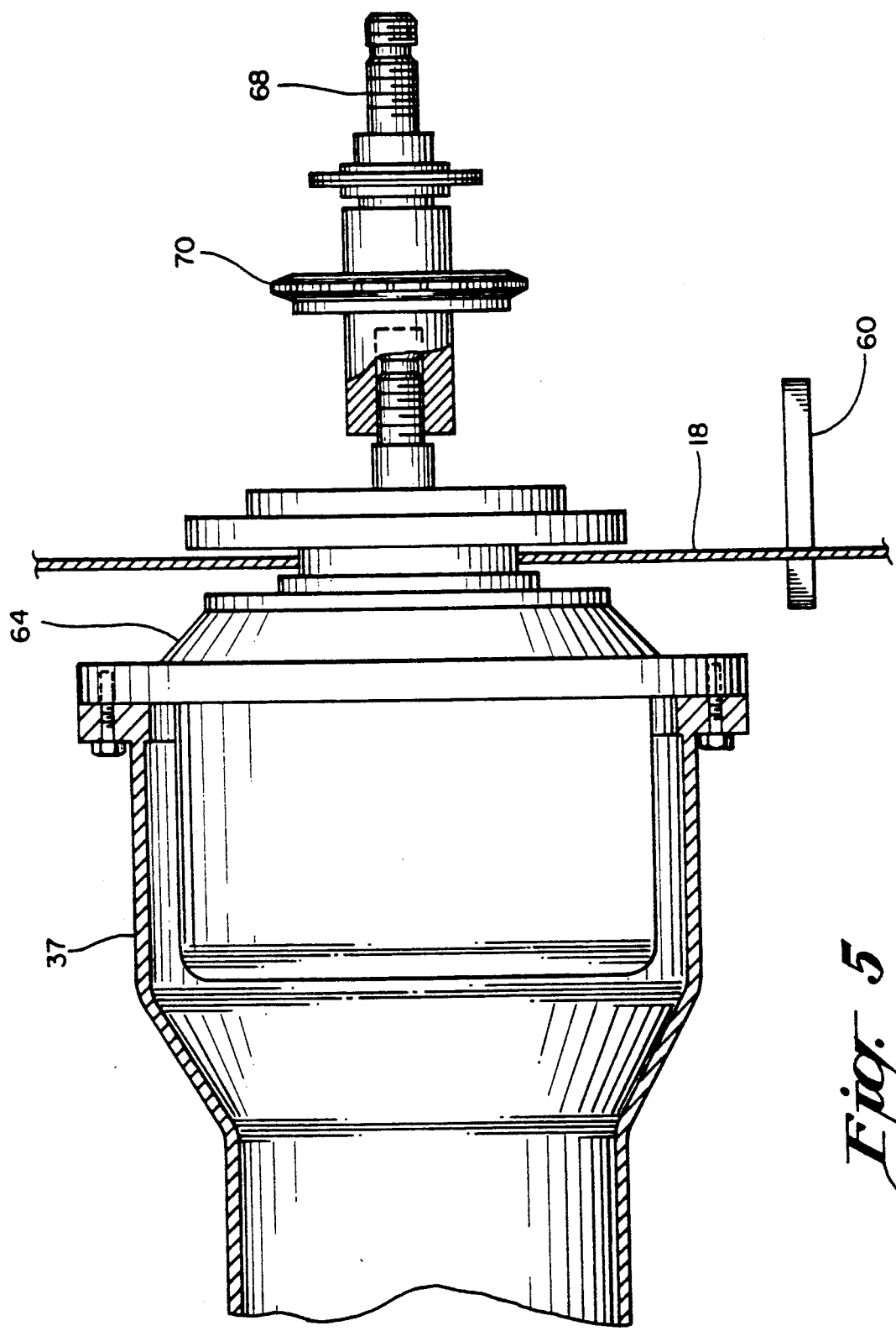
FIG. 5 is a partial elevation and partial sectional view illustrating details of the coupling of the planetary gear arrangement to the auger shaft and input drive shaft in a preferred embodiment of the present invention.

As shown in FIGS. 1 and 2, an input drive shaft 68 has attached thereto an expeller drive sprocket 70. Input drive shaft 68 is adapted for coupling to and rotational displacement by the power take-off (PTO) shaft of a tractor, which is not shown in the figure for simplicity. Input drive shaft 68 is also coupled to the shaft 37 of auger 36 by means of a planetary gear box 64 as shown in the plan view of FIG. 5. The longitudinal axes of input drive shaft 68 and the auger shaft are aligned and coincident. Expeller drive sprocket 70 is coupled to an expeller driven sprocket 74 by means of an endless chain 72. Expeller driven sprocket 74 is coupled to and rotates about the axis of a shaft 60 of expeller 34. The expeller shaft 60 and the input drive shaft are coupled by means of a forward pivot arm 50. Expeller shaft 60 extends through a small circular aperture (not shown) in forward wall 18 of tank-type body 12 and is prevented from translational motion, although it is freely rotatable as described above. Planetary gear box 64 extends through an elongated, radial aperture in forward wall 18 as shown in FIG. 5. The aperture through which the planetary gear box 64 extends is covered by a forward slidable plate 46 which is attached to and displaced with the forward pivot arm 50. Pivot arm 50 includes an aperture through which the planetary gear box 64 extends as well as an aperture through which the expeller shaft 60 extends permitting the pivot arm to be displaced about expeller shaft. Rotational displacement of the forward pivot arm 50 about the expeller shaft 60 allows for displacement of the conveyor auger shaft in the direction of arrow A. The slot in the forward wall 18 through which the planetary gear box 64 extends is covered by forward slidable plate 46 to prevent leakage of manure from the tank-type body 12.

A double-acting hydraulic cylinder 40 is coupled at its butt end by means of a first coupling pin 56a to A-frame 30. Hydraulic cylinder 40 is further coupled at its ram end by means of a second coupling pin 56b to forward pivot arm 50. Hydraulic cylinder 40 is attached to a suitable hydraulic pressure source which is not shown in the figure for simplicity. Extension of the ram of hydraulic cylinder 40 causes counterclockwise rotation of the forward pivot arm 50 and conveyor auger 36 about the expeller shaft 60. Full extension of the hydraulic cylinder's ram positions the conveyor auger 36 in an upraised position shown in dotted line form and identified as 36' in the figure. From FIG. 2, it can be seen that the radial displacement of the conveyor auger 36 about the expeller shaft 60 by means of hydraulic cylinder 40 moves the conveyor auger up the right side wall 14 of tank-type body 12 while maintaining the spacing between conveyor auger and tank's side wall essentially constant as shown by the two sets of arrows B and C. Arrows B represent the spacing between the conveyor auger 36 and tank-type body 12 with the conveyor auger in the full down position. Arrows C represent the spacing between the conveyor auger 36 and the tank-type body 12 with the conveyor auger in the full up position 36'. By thus maintaining the separation between the conveyor auger 36 and the tank-type body 12 essentially constant as the conveyor auger is raised to engage bridging manure, the working relationship between the conveyor auger and tank wall is maintained for efficient engagement and displacement of the manure by the conveyor auger.

Referring to FIG. 3, there is shown an aft elevation view of the manure spreader 10 illustrating the details of the structure which supports and displaces the aft end of the conveyor auger. The aft end of the conveyor auger extends through an arcuate slot in an aft mounting plate 20a attached to the spreader's aft wall 20. The aforementioned arcuate slot is not shown in FIG. 3 as it is covered by an aft slidable plate 48 attached to the movable end of an aft pivot arm 52. Aft pivot arm 52 is coupled to the aft mounting plate 20a by means of a pivot pin 76 permitting the combination of the aft pivot arm and aft slidable plate 48 to be displaced upward and downward in an arcuate path on the outer surface of the aft mounting plate. The butt end of an aft hydraulic cylinder 42 is attached to an aft mounting bracket 44, while the ram end of the hydraulic cylinder is attached to the aft pivot arm 52 for pivotally displacing the pivot ram and slidable plate combination about pin 76. A curvilinear, strip-like retainer 54 is attached to the aft mounting plate 20a adjacent the aft slidable plate 48 and includes a lip 54a extending over the slidable plate for maintaining the plate in intimate contact with the aft mounting plate. The pivot arm retainer 54 thus maintains the aft slidable plate 48 in sealed contact with the aft mounting plate 20a over the slot therein through which the conveyor auger extends to prevent leakage from the tank-type body 12. Pivot pin 76 is aligned with expeller shaft 60 to facilitate raising and lowering of the conveyor auger about the pivot axis by the forward and aft pivot arms 50, 52 which are actuated in unison. The coordinated actuation of pivot arms 50, 52 is accomplished with master-slave related hydraulic cylinders or a flow divider/combiner valve as an alternate method.

Figure 4:
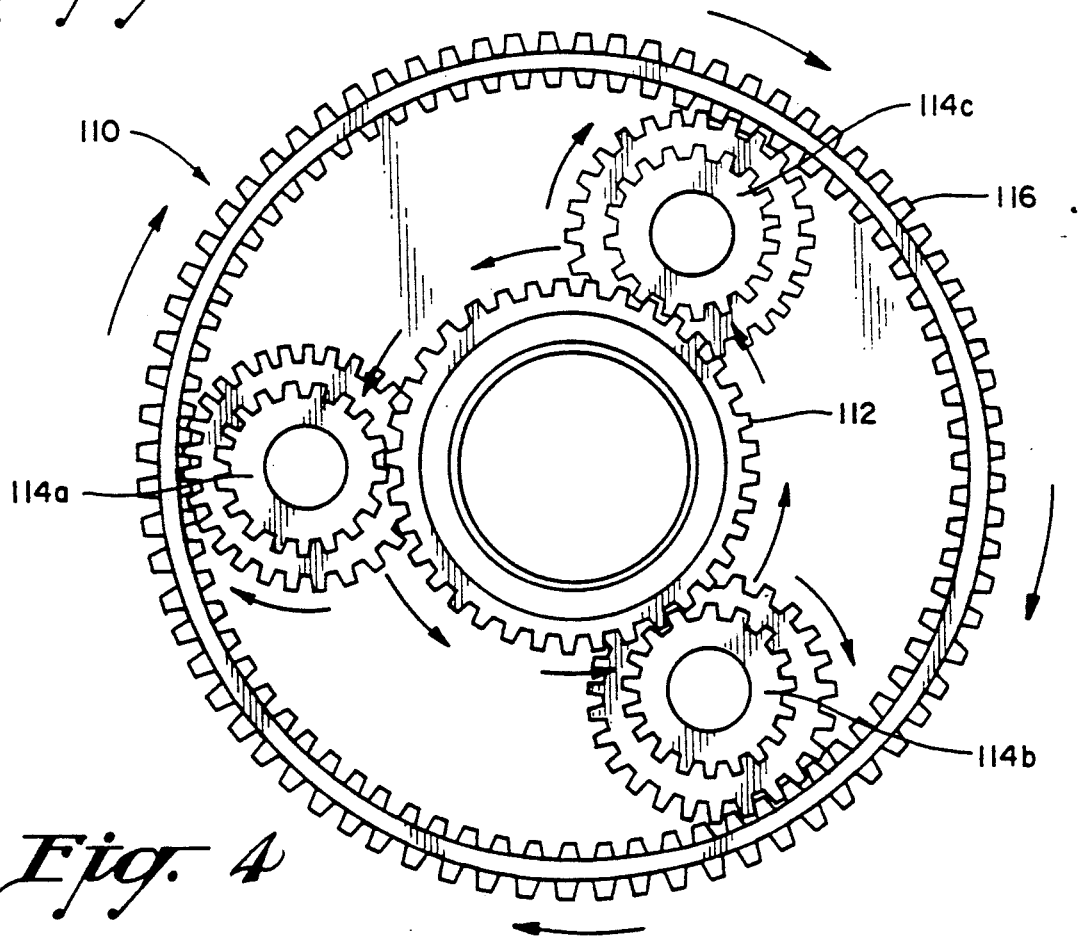
FIG. 4 is a plan view of a planetary gear arrangement for use in driving the conveyor auger in a preferred embodiment of the present invention.

Referring to FIG. 4, there is shown a conventional planetary gear arrangement 110 which may be used for coupling the input shaft to the conveyor auger in the present invention. Planetary gear 110 is disposed in a closed housing as shown in FIGS. 1 and 2 which isolates the gear components from the elements for increased reliability. Planetary gear 110 includes an inner sun gear 112 which is coupled to and rotates with the input shaft in a counterclockwise direction as shown by the arrows in the figure. Disposed about and engaging the sun gear 112 are a plurality of satellite, or planet, gears 114a through 114c. The satellite gears 114a–114c are disposed about the sun gear 112 in an equally spaced manner and are rotationally displaced clockwise as shown by the associated arrows in the figure. Each of the satellite gears 114a–114c also engages and rotationally displaces an outer ring gear 116 in a clockwise direction as shown by the outermost arrows. The carrier for the satellite gears is the stationary portion of the planetary gear attached to the front pivot arm. Thus, the outer ring gear 116 rotates in a direction opposite to the direction of rotation of the inner sun gear 112. The dual gear configuration of each of the satellite gears allows for a reduction of the rotation of the outer ring gear 116 relative to the inner sun gear 112. The auger typically rotates at approximately 20 RPM, while the PTO shaft of a tractor rotates at a much higher speed such as on the order of 1,000 RPM. The auger and expeller rotate in opposite directions to allow for an overhand discharge motion for the rotating expeller.

Use of the planetary gear 110 for rotationally driving the spreader's auger additionally increases the drive system reliability by eliminating prior art serpentine chain/sprocket speed reduction drive systems. The planetary gear drive arrangement also reduces power requirements by internalizing loads in a closed housing employing continuous transmission lubrication. Frictional losses due to non-lubricated external drive components are substantially reduced in this embodiment of the present invention. Auger and expeller drive system simplification is also achieved by directly coupling the tractor's PTO shaft to the transmission input shaft and using a direct chain drive from the input shaft to the expeller for more efficient input power transmission. Reducing drive system power requirements permits the handling and spreading of denser, harder packed manure deposits without a substantial increase in tractor operating costs. A universal joint such as a pair of coupled U-brackets well known to those skilled in the relevant arts may be used to connect the input drive shaft 68 to the tractor's PTO shaft to permit displacement of the input drive shaft and auger as previously described relative to the tractor's PTO.

Figure 6:
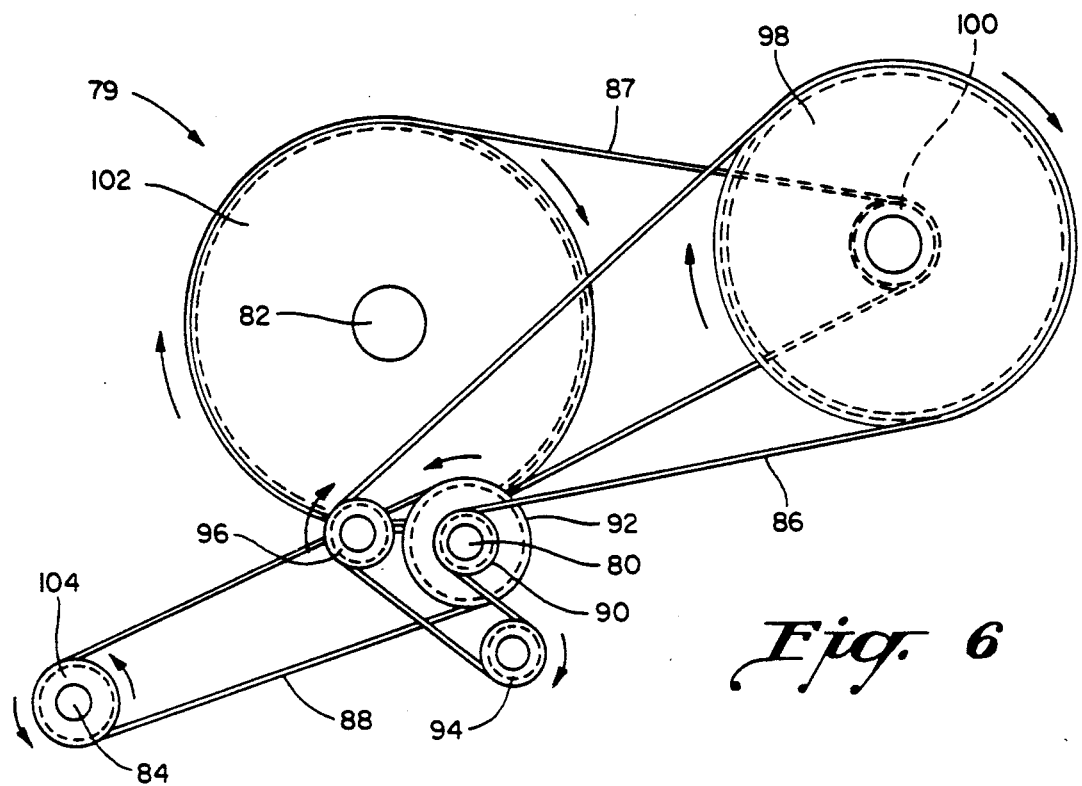
FIG. 6 is a simplified schematic diagram of a sprocket and chain drive arrangement for driving the conveyor auger and discharge expeller in accordance with another embodiment of the present invention.
Figure 7:
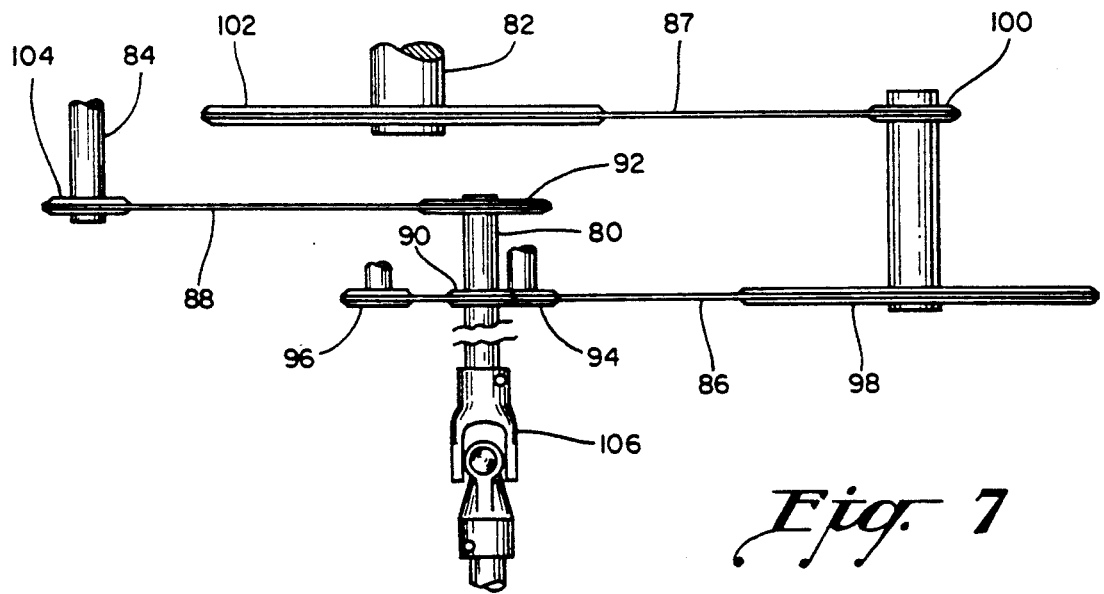
FIG. 7 is a simplified plan view of the drive chain and sprocket arrangement of FIG. 6.

Referring to FIG. 6, there is shown an elevational view of a combination sprocket and chain drive system 79 for use in another embodiment of the present invention. A plan view of the sprocket and chain drive system 79 of FIG. 6 is shown in FIG. 7. The output shaft of a tractor's PTO is coupled by means of a universal joint 106 to an input shaft 80. Mounted on input shaft 80 is a first driver sprocket 90 of the auger and a driver sprocket 92 of the expeller. An initial auger drive reduction chain 86 couples the first auger driver sprocket 90 to a first driven reduction sprocket 98 for the auger. The first driven reduction sprocket 98 is on a common shaft with a second driven auger reduction sprocket 100 which, in turn, is coupled by means of a final auger drive reduction chain 87 to an auger driven sprocket 102. The auger driven sprocket 102 is attached to the auger shaft 82 for rotationally displacing the auger about its longitudinal axis. The relative sizes of the first and second driven reduction sprockets 98, 100 allow for a reduction in the auger rotational speed relative to that of the input shaft 80. First and second idler sprockets 94 and 96 are also coupled to the initial auger drive reduction chain 86 for maintaining the reduction chain under tension and for allowing the reduction chain to be back-wrapped around input shaft 80 in order to drive the auger shaft 82 in an opposite direction of rotation.

The expeller drive sprocket 92 attached to the input shaft 80 is coupled by means of an expeller drive chain 88 to an expeller driven sprocket 104 attached to the expeller shaft 84. There is thus a direct chain drive between the input shaft 80 and expeller shaft 84, with both shafts rotating in the same direction. The auger shaft 82 and the expeller shaft 84, thus rotate in opposed directions. Suitable linkage may be provided for permitting the auger shaft 82 and the first and second driven reduction sprockets 98 and 100 for the auger to be displaced as the auger is raised and lowered within the spreader tank. This linkage may include pivoting rigid coupling members in combination with various springs to maintain the initial and final auger drive reduction chains 86 and 87 under tension.

There has thus been shown a manure spreader having a V-shaped storage tank containing a conveyor auger and a rotary expeller disposed adjacent a discharge aperture in the tank for receiving and spreading manure directed through the aperture by the auger. The conveyor auger is raised and lowered in an arc-like path preferably about the expeller's axis to break up and direct hard packed manure through the discharge aperture and prevent the formation of bridges by the dense manure. The conveyor auger is positioned in closely spaced relation to the inner surface of the tank's V-shaped bottom, with the auger-wall spacing remaining essentially constant as the rotating auger is displaced through a radial arc for maintaining (1) close, fixed auger to expeller spacing and (2) the wall-auger working relationship required for continuous, high volume manure discharge from the tank. By also maintaining a fixed distance between the auger and expeller, a common drive system using a minimum number of sprockets and chains may be employed for reduced cost and increased reliability. The radial arc path of the auger to one side of the tank provides a wider open area in the tank for chunky, solid manure to drop down into the trough bottom adjacent the auger. Various drive arrangements may be used for rotationally displacing the conveyor auger and the expeller, with a planetary gear arrangement preferred for directly driving the auger because of its simplicity, the use of a closed housing allowing for continuous gear lubrication, reduced power requirements, and more efficient coupling from the tractor's PTO shaft to the spreader's auger.

While particular embodiments of the present invention have been shown and described, it will be obvious to those skilled in the art that changes and modifications may be made without departing from the invention in its broader aspects. For example, while the figures depict the expeller as being disposed on the right side of the spreader's tank-like body and the auger being displaced to the right within the hollow body, applicant's invention will operate equally as well with the expeller positioned on the left side of the tank-like body and the auger being displaced to the left. In the latter case, the directions of rotation of the auger and expeller and associated gears and/or sprockets would be reversed from that disclosed above. Variation in auger movement could also accomplish similar advantages as described. For example, the auger could be moved in a straight path to approximate the arc along the tank side or the arc center may be placed adjacent to, but not exactly on, the expeller axis. Therefore, the aim of the appended claims is to cover all such changes and modifications as fall within the true spirit and scope of the invention. The matters set forth in the foregoing description and accompanying drawings are offered by way of illustration only and not as a limitation. The actual scope of the invention is intended to be defined in the following claims when viewed in their proper perspective based on the prior art.

We claim:

1. In a manure spreader having an elongated hopper with at least one downwardly and inwardly sloped side wall and a discharge aperture in a lower portion of said inwardly sloped side wall of said hopper, wherein manure is stored in said hopper for discharge, the combination comprising:

a conveyor auger disposed in a lower portion of said hopper and having a first axis of rotation;

expeller means disposed on an outer, lower, lateral portion of said hopper adjacent the discharge aperture therein for spreading manure discharged through the aperture to one side of the spreader;

mounting means for positioning said auger in a lowered position at the bottom of said hopper adjacent the discharge aperture and for moving said auger between said lowered position and a raised position while maintaining substantially constant spacing between said auger and said expeller means, and wherein said auger is moved along a path substantially parallel to said at least one sloped side wall to maintain a substantially constant distance from an inner surface of said at least one sloped side wall and the periphery of said auger during movement between said raised and lowered positions, thereby to permit said auger to break up manure disposed above said auger in a bridged configuration while continuing to maintain a conveyor relationship with said at least one sloped side wall during raising of said auger.

2. The combination of claim 1 wherein said mounting means includes first and second pivot arms coupled to respective ends of said auger and adapted for pivoting displacement about a second axis aligned with said first axis.

3. The combination of claim 2 wherein said mounting means further includes first and second hydraulic cylinders coupled respectively to said first and second pivot arms for moving said auger between said raised and lowered positions.

4. The combination of claim 3 wherein said hopper further includes forward and aft walls and wherein said combination further includes first and second seal means coupled respectively to said first and second pivot arms and respectively engaging said forward and aft walls of said hopper for preventing manure leakage from said hopper during movement of said auger between said raised and lowered positions.

5. The combination of claim 4 wherein said expeller means has an axis of rotation coincident with said second axis.

6. The combination of claim 1 further comprising drive means coupled to said auger for displacing manure in a lower portion of said hopper toward the discharge aperture and further coupled to said expeller means for spreading manure discharged through the aperture.

7. The combination of claim 6 further comprising coupling means for connecting said drive means to a power take-off (PTO) unit of a traction vehicle.

8. The combination of claim 6 wherein said drive means includes a plurality of sprockets and endless chains for displacing said auger and said expeller means in first and second opposed directions of rotation.

9. The combination of claim 8 wherein said drive means further includes an input drive shaft and first and second rotation reduction sprocket and chain drive arrangements for rotationally displacing said expeller means and said auger at first and second RPMs, respectively, where said second RPM is less than said first RPM.

10. The combination of claim 6 wherein said drive means includes an input drive shaft and a planetary gear arrangement coupling said input drive shaft to said auger.

11. The combination of claim 10 wherein said drive means further includes first and second sprockets respectively coupled to said input drive shaft and to said expeller means, and wherein said drive means further includes an endless chain coupling said first and second sprockets.

12. For use in a manure spreader having a hollow tank for storing manure, wherein said tank includes an open upper portion and at least one inwardly and downwardly directed side wall forming a V-shaped bottom, the combination comprising:
  auger means disposed lengthwise within and along the V-shaped bottom of the tank and including a shaft and a manure transport structure disposed along the length of said shaft for engaging and displacing manure in the tank toward a discharge aperture in the V-shaped bottom of the tank;
  expeller means disposed adjacent said discharge aperture outside of the tank for receiving manure from said discharge aperture and spreading the manure on one side of the spreader;
  displacement means coupled to said auger means for moving said auger means between a lowered position adjacent the V-shaped bottom of the tank to a raised position for engaging and directing manure forming a bridge over said auger means through said discharge aperture;
  an input shaft adapted for coupling to and rotational displacement by a power take-off shaft of a tractor;
  first drive means coupling said input shaft to said expeller means for rotationally displacing said expeller means in a first direction at a first speed; and
  second drive means including a planetary gear disposed within a closed housing and coupling said input shaft to said auger means for rotationally displacing said auger means in a second direction at a second speed, where said second direction is opposite to said first direction and said second speed is less than said first speed, and wherein said second drive means is coupled to said displacement means for movement with said auger means between said lowered and raised positions.

13. The combination of claim 12 wherein said first drive means includes a direct drive including a first drive sprocket attached to said input shaft, a second driven sprocket attached to said expeller means, and a drive chain coupling said first drive and said second driven sprockets.

14. The combination of claim 13 further including a universal coupler for connecting the power take-off shaft of a tractor to said input shaft.

15. The combination of claim 12 further comprising pivot arms coupled to said auger means and to said displacement means for displacing said auger means radially about a pivot axis when moved between said lowered and raised positions.

16. The combination of claim 15 wherein said pivot axis is coincident with a rotational axis of said expeller means.

* * * * *